United States Patent [19]

Tanaka

[11] 4,071,930

[45] Feb. 7, 1978

[54] PINCHING CLIP

[75] Inventor: Toshie Tanaka, Machida, Japan

[73] Assignees: Nifco Inc.; Nichiei Bussan Co., Ltd., both of Tokyo, Japan

[21] Appl. No.: 709,061

[22] Filed: July 27, 1976

[51] Int. Cl.² .................................................. A44B 27/00
[52] U.S. Cl. .................................. 24/252 R; 24/255 R; 24/137 R
[58] Field of Search .......... 24/252 R, 252 B, 252 HC, 24/252 CP, 252 PC, 255 R, 255 C, 255 G, 255 HC, 255 A

[56] References Cited

U.S. PATENT DOCUMENTS

| 1,891,494 | 12/1932 | Baltzley | 24/252 PC |
| 2,676,377 | 4/1954 | Garcia | 24/137 A |
| 2,931,086 | 4/1960 | Rose | 24/137 R |
| 3,292,223 | 12/1966 | Esposito | 24/137 R |
| 3,384,935 | 5/1968 | Salvador | 24/137 A |
| 3,720,979 | 3/1973 | Krawagna | 24/252 R |

FOREIGN PATENT DOCUMENTS

| 1,241,572 | 6/1967 | Germany | 24/252 CP |
| 89,501 | 6/1937 | Sweden | 24/252 CP |
| 207,775 | 10/1966 | Sweden | 24/137 |

Primary Examiner—Bernard A. Gelak
Attorney, Agent, or Firm—Robert W. Beart; J. R. Halvorsen

[57] ABSTRACT

Disclosed is a pinching clip which comprises a pair of pinching arms interconnected through the medium of a hinge portion, an elastic brace disposed astraddle said hinge portion and joined at the opposed extremities thereof with the rear sides of said pinching arms, and damping pieces disposed one behind each said pinching arm in such a way that when the two pinching arms are closed by virtue of the pressure exerted thereon by the finger tips, the otherwise possible sudden closing motion of the clip will be retarded. When the clip is closed, the damping pieces disposed on the rear sides of the pinching arms produce an action of retarding the movement of finger tips, with the result that otherwise possible sudden closing motion of the clip is retarded when the clip changes form from its opened state into its closed state.

5 Claims, 4 Drawing Figures

PINCHING CLIP

BACKGROUND OF THE INVENTION

This invention relates to an improvement in and concerning a pinching clip of synthetic resin, which improvement enables a pair of pinching arms interconnected through the medium of a hinge portion to be elastically braced regardless of whether they are in a closed state or in an opened state.

In one typical version, said clip is made up of a pair of pinching arms interconnected through the medium of a hinge portion and an elastic brace disposed astraddle said hinge portion and joined to the rear sides of said pinching arms. When this clip is operated to change form from its opened state to its closed state so as to pinch a soft article, for example, the elastic force which has so far tended to hold the two pinching arms back to their opened state reaches the point at which it switches to exert its effect in the opposite direction of bringing the two arms into their closed state. This clip, therefore, has a disadvantage that the pinching arms suddenly grip a soft article and consequently inflict some damage on the article. This clip is not suitable for use on such soft articles. For the purpose of opening the clip from its closed state, there is inevitably required a troublesome operation of forcibly pushing the ends of said pinching arms of the clip away from each other.

An object of this invention is to provide a pinching clip of improved design such that possible sudden motion of the clip parts during the change of form from its opened state to its closed state or vice versa can be retarded and said change of form can be accomplished by a simple movement of the finger tips.

SUMMARY OF THE INVENTION

To accomplish the object described above according to this invention, there is provided a pinching clip which comprises a pair of pinching arms interconnected through the medium of a hinge portion and an elastic brace disposed astraddle said hinge portion and connected at the extremities thereof with the rear sides of said pinching arms and incorporates, in addition thereto, damping pieces disposed in tangential directions one behind each said pinching arm so that when the pinching arms are closed toward each other between the finger tips, the damping pieces serve the purpose of retarding the closing motion of the clip.

When the finger tips are held against the outsides of the pinching arms in their opened state and are moved toward each other to cause the ends of said pinching arms to close toward each other, the damping pieces disposed in tangential directions behind the pinching arms apply themselves against the inner sides of the fingers and serve to retard the closing motion of the pinching arms. When the pinching arms are desired to be opened from their closed state, the opening can be obtained by merely pressing the damping pieces inwardly toward each other.

The object and the characteristic features described above and the other objects and characteristic features of the present invention will become apparent from the description to be given herein below with reference to the accompanying drawing.

DESCRIPTION OF THE PREFERRED EMBODIMENT

Figure 1:
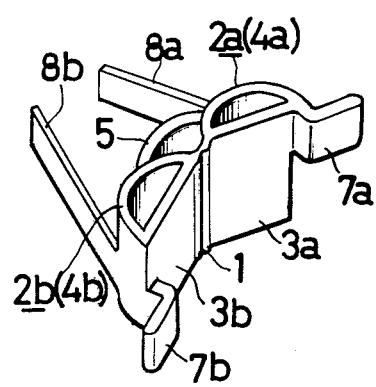
FIG. 1 is a perspective view of one preferred embodiment of the pinching clip of this invention, held in its opened state.

The drawing illustrates one preferred embodiment of the plastic pinching clip according to this invention. In the illustrated embodiment, the two pinching arms 2a, 2b interconnected at their respective confronting ends through the medium of a first thin-walled hinge portion 1 are each approximately in the shape of a semi-cylinder, so that they assume a roughly cylindrical shape when they are in a closed state. The pinching arms are provided with pieces 3a, 3b which are so shaped as to form chords with respect to the semi-cylinders of said arms. An arcuate elastic brace 5 is disposed astraddle said first hinge portion 1 and joined with the medium of second thin-walled hinge portions 6a, 6b to the rear sides of the arcuate pieces 4a, 4b of the pinching arms 2a, 2b.

Figure 2:
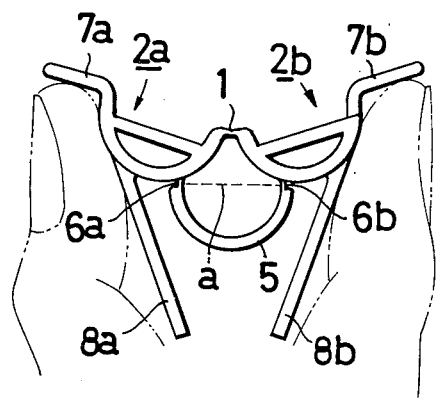
FIG. 2 is a plan view of the pinching clip of FIG. 1, held in its opened state.
Figure 3:
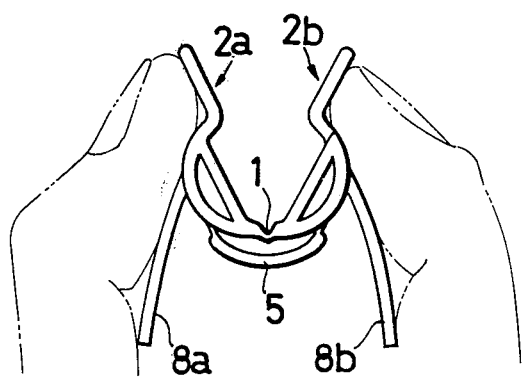
FIG. 3 is an explanatory diagram showing the pinching clip of FIG. 1 in the process of closing motion.
Figure 4:
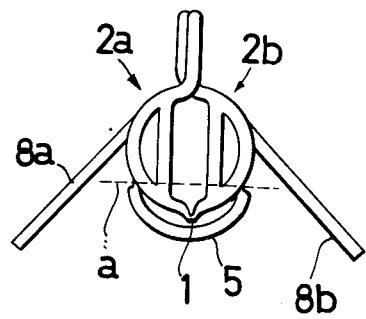
FIG. 4 is a plan view illustrating the pinching clip of FIG. 1, held in its closed state.

The line "a" connecting the second hinge portions 6a, 6b forms the elasticity switching operative line. The first hinge portion 1 which joins the pinching arms 2a, 2b falls below the operative line "a" in the illustrated relative position, namely within the space embraced in the arcuate pieces 4a, 4b, when the two arms are in a closed state (FIG. 4). It comes above the operative line "a", namely outside the space embraced in the arcuate pieces 4a, 4b when the arms are in an opened state (FIG. 2). When the clip is operated so as to change form from its opened state (or closed state) to the opposite state, the first hinge portion 1 gradually approaches the operative line "a" and, as it advances past this line, the two arms 2a, 2b are impelled toward assuming the opposite state. If in this case the clip is being operated in the direction of being closed, the free ends of the arms snap into engagement to grasp the article.

Preferably, a pair of operating pieces 7a, 7b are disposed in mutually staggered relationship at the free ends of the pinching arms 2a, 2b with which they are integrally to extend outwardly and substantially parallelly with the diametric pieces 3a, 3b so that when the two arms are brought into a closed state, the pieces 7a, 7b snap into mutually hooked engagement. When these operating pieces are incorporated, desired opening of the clip by the fingers can easily be attained by placing the finger tips against the mutually hooked operating pieces and moving said finger tips in opposite directions. When the arcuate pieces 4a, 4b are held between the inner sides of the thumb and the index finger and the two arms are caused to change form from their opened state into their closed state, the tips of the fingers can be made to rest against the operating pieces 7a, 7b and the two arms can thus easily be retained accurately in effective position.

This invention is directed to providing the two pinching arms 2a, 2b on their outer faces with damping pieces adapted so that when the arms are moved into their closed state by being held between the inner sides of the thumb and index finger, the damping pieces come into fast contact with said inner sides of the fingers. In the illustrated embodiment, the damping pieces 8a, 8b are integrally extended substantially in tangential directions from the vicinities of the free ends of arcuate pieces 4a, 4b of the arms 2a, 2b. When the two arms are in an opened state, these damping pieces extend beyond the ends of the elastic brace 5 in parallel or somewhat convergent relationship. When the arms are in a closed state, the damping pieces are opened to the extent of forming an angle of about 45° each relative to the confronting surfaces of the pieces 3a, 3b.

If the two arms 2a, 2b in their opened state are held between the inner sides of the thumb and index finger so as to be closed, therefore, the damping pieces 8a, 8b come into intimate contact with or come close to the inner sides of the fingers. If the two fingers are moved toward each other in an attempt to close the two arms 2a, 2b, the damping pieces 8a, 8b gradually diverge and press themselves against the inner sides of the fingers and consequently prevent the free ends of the arms from suddenly snapping into closure as the first hinge portion 1 advances past the operative line "a" and, instead, make them close slowly. If the damping pieces are given a length such that they protrude downwardly from the operative line "a" while the arms are in an opened state, then the pinching arms can be opened from their closed state by pressing the protruding ends of the damping pieces toward each other by the finger tips.

In short, the damping pieces have only to be adapted so that when the two pinching arms are held between the fingers and are brought into their closed state, the damping pieces simultaneously come into intimate contact with or come close to the inner sides of the fingers and, as the arms gradually converge, they proportionally diverge and apply increasingly more pressure against the inner sides of the fingers. The length and direction of these damping pieces may suitably by fixed so as to meet this end.

The pinching clip of this preferred embodiment is a one-piece product molded of a plastic material of proper elasticity such as, for example, nylon 6 or polypropylene. It may otherwise be obtained by joining a plurality of plastic and/or metal parts with the aid of hinges. The shape of the pinching arms 2a, 2b is not limited to that which is illustrated herein but may be selected from a rich variety of shapes.

According to the present invention, the disavantage that the pinching arms suddenly snap into a closed state is eliminated. When a plant is grafted, this pinching clip may be set in position to keep the joined ends tightly. As the plant grows and gains in diameter to an extent such that the thin-walled portion 1 advances past the operative line "a", the clip opens by itself and falls off the joined point. Thus, the clip finds utility as a grafting clip, for example.

What is claimed is:

1. A one-piece plastic pinching clip including a pair of arcuate arms each having a predetermined width and interconnected along adjacent first ends through a hinge portion with the concave sides of said arms facing toward each other, an elastic overcenter spring brace disposed astraddle said hinge portion and integrally connected at each extremity thereof with one of the rear convex sides of said arms, pinching means disposed within said concave sides of said arms, an elongated damping piece extending substantially tangentially from the convex side of each arm along a line positioned intermediate the ends of said arms, operating means extending outwardly from the free end of each arm opposite the adjacent hinged ends whereby an operator can embrace the clip and grasp the operating means between his thumb and forefinger and apply pressure thereto to close said arms against the action of said spring brace with the damping pieces riding on the interior of the operator's finger and thumb.

2. A clip of the type claimed in claim 1 wherein said operating means each includes an extension piece which extends substantially perpendicularly to a line tangent to the convex surface adjacent the end of each arm opposite said hinged first end.

3. A clip of the type claimed in claim 2 wherein said extension pieces each have a width less than the width of the arm to which it is attached and said extensions are laterally offset relative to each other so that said extensions are positioned adjacent to one another in overlapped relation when viewed along the axis of said hinge when the clip is in closed position.

4. A clip of the type claimed in claim 1 wherein said pinching means includes an element chordally disposed within the concave side of each arm.

5. A clip of the type claimed in claim 1 wherein each arcuate arm is substantially semi-cylindrical in cross section, each extension piece includes a first portion of lesser width than its associated arm and which is a substantially smooth combination of the curvature of said arm, and a second portion which extends substantially perpendicular to said first portion, said first and second portions associated with opposed arms lying in side-by-side laterally offset relation and said second portions lying on opposite sides of a plane lying on he axis of both said arms and said hinge when the clip is in closed position.

* * * * *